United States Patent [19]

Densmore

[11] 4,270,653

[45] Jun. 2, 1981

[54] CONVEYOR FEED APPARATUS

[75] Inventor: Neal W. Densmore, Franklin, Pa.

[73] Assignee: Joy Manufacturing Company, Pittsburgh, Pa.

[21] Appl. No.: 4,623

[22] Filed: Jan. 18, 1979

Related U.S. Application Data

[63] Continuation of Ser. No. 795,270, May 9, 1977, abandoned.

[51] Int. Cl.³ .............................................. B65G 47/18
[52] U.S. Cl. .................................... 198/554; 198/311; 198/537
[58] Field of Search ................... 299/64; 198/311, 510, 198/511, 514, 515, 516, 518, 550, 554, 520, 537

[56] References Cited

U.S. PATENT DOCUMENTS

| 1,362,889 | 12/1920 | Newdick | 198/520 |
| 1,476,897 | 12/1923 | Levin | 198/520 |
| 1,659,696 | 2/1928 | Morgan | 198/520 |
| 1,673,526 | 6/1928 | Newdick | 198/520 |
| 2,114,438 | 4/1938 | Cartlidge | 198/520 |

Primary Examiner—Jeffrey V. Nase
Attorney, Agent, or Firm—J. Stewart Brams

[57] ABSTRACT

A conveyor feed apparatus cooperable with a conveying apparatus for controlled feeding of material to the conveying apparatus in a manner that overfilling of the conveyor apparatus is avoided.

7 Claims, 4 Drawing Figures

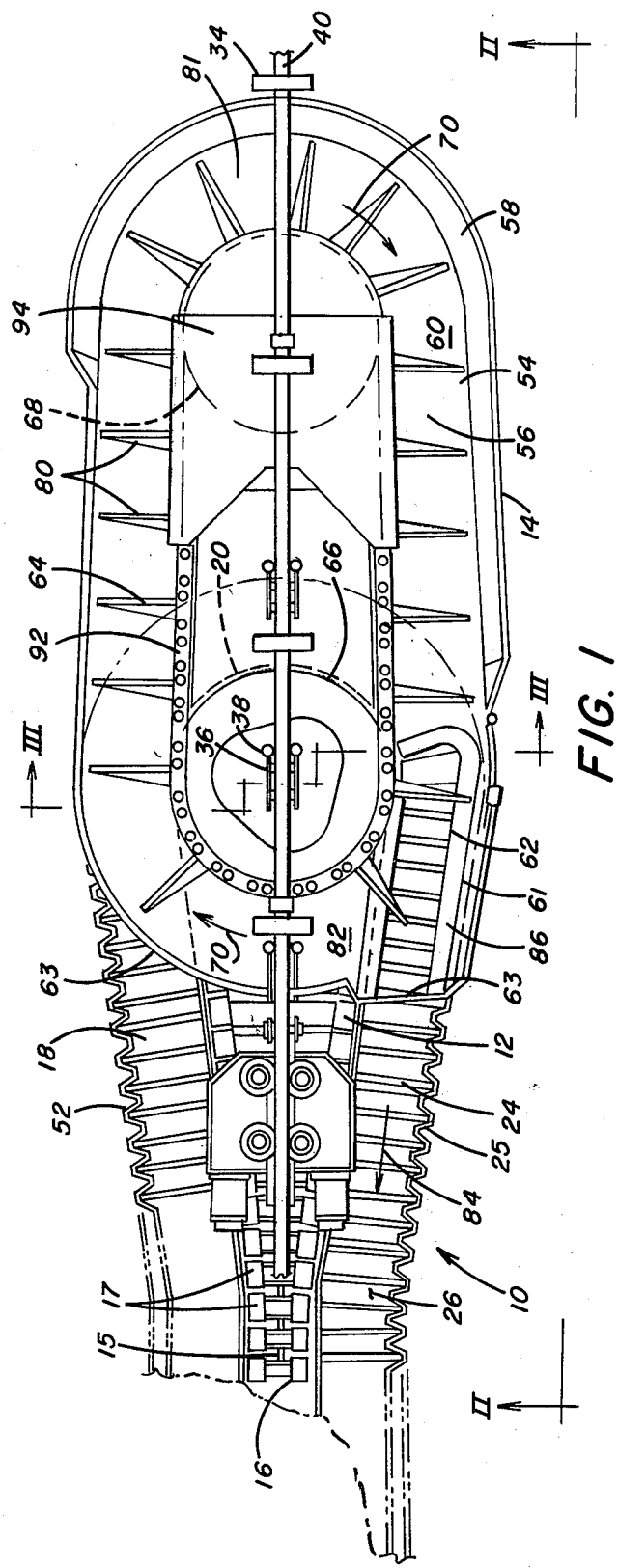
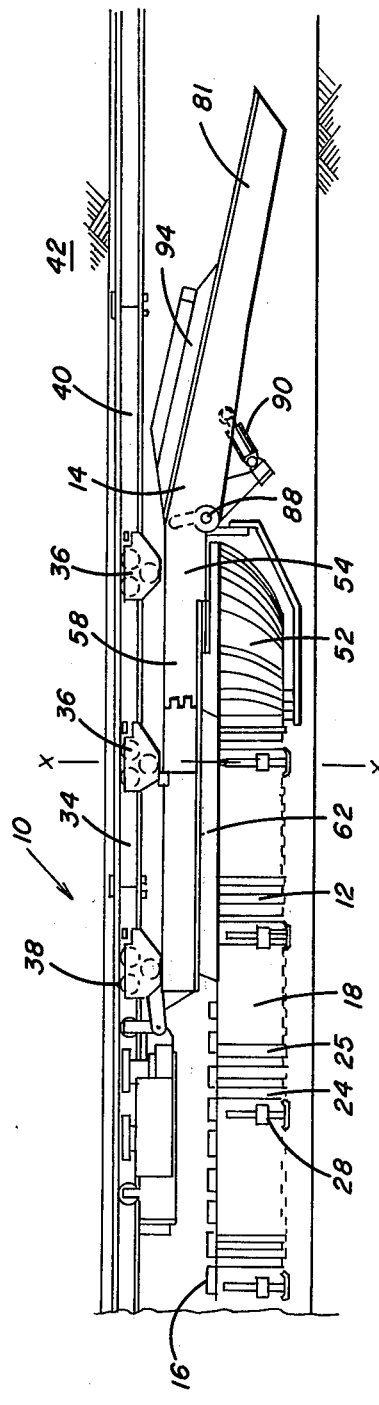
FIG. 1
FIG. 2

CONVEYOR FEED APPARATUS

This is a continuation of application Ser. No. 795,270, filed May 9, 1977, and now abandoned.

In the material conveying arts it is well known to provide conveyor systems for continuous bulk conveying of material, especially lump or granular material such as coal, from one point to another. For example, in underground coal mining the mined coal must be continuously transported from the mine face to a main haulage system such as a stationary panel belt conveyor as mining proceeds. Among the various prior conveyor systems proposed for this purpose have been those including an endless conveying element such as a flexible belt trained for orbital travel about a closed loop path defining an upper conveying traverse overlying a lower return traverse. Another recently developed conveyor especially well adapted for transporting material in restricted spaces such as low coal mines includes a flexible, endless deeply troughed belt which is driven in a closed, generally horizontally extending loop to define laterally side-by-side conveying and return traverses thereof extending longitudinally adjacent the laterally opposite sides of an elongated support assembly such that the troughed conveying portion of the belt is continuously upwardly open throughout a major part of both the conveying and return traverses. This horizontal loop conveyor minimizes coal spillage and is well adapted for use in restricted head room since the total vertical height thereof is that of a single traverse rather than two stacked or overlying traverses as in conventional systems. Such a horizontal loop conveyor is disclosed in copending U.S. application Ser. No. 862,254, filed Dec. 19, 1977, which is assigned to the same assignee as is the instant invention and the specification of which is incorporated herein by reference.

The horizontal loop conveyor system described in the hereinabove referenced application has proven to be a significant advance over prior endless belt conveyors; however, due to its unique design interfacing the horizontal loop conveyor with more conventional conveyor apparatus has required special consideration. For example, the transferring or feeding of conveyed material from conventional haulage means such as shuttle cars or bridge conveyors to the horizontal loop conveyor must be carefully controlled to ensure that the deeply troughed belt will be loaded efficiently and uniformly and with minimal material spillage. Prior load transfer or feed devices such as taught in U.S. Pat. Nos. 2,612,299, 2,709,537 and 3,411,676 are not well suited for such application and accordingly, an improved feed apparatus was required.

This invention relates to improved feed means preferably carried by a portion of a conveyor means such as a horizontal loop conveyor for feeding material into the troughed belt and including a deck portion formed as a bin or platform adapted to receive material from a bridge conveyor, shuttle car or other conventional conveying means. A portion of the feed means of this invention overlies a portion of the conveyor means fed thereby adjacent a point suitable for loading material into the troughed belt, preferably through a gravity chute means located so as to feed material to the conveyor belt after it has substantially completed its traverse around the terminal end drum or sprocket and is beginning its conveying run. In one preferred embodiment the invention includes an elongated deck portion which extends longitudinally outwardly of the conveyor terminal end and may be moved to selected elevations for easy access by a loading machine, shuttle car or bridge conveyor. The elongated deck provides a large material deposit area thereby alleviating the spillage problems associated with direct transfer of the conveyed material from conventional conveying apparatus into the deeply troughed belt. A conveying means cooperable with the feeder bin is provided to move the material deposited in the bin to the feed chute. This conveying means preferably is operably connected to the conveyor being fed by the feeder and preferably in a manner to provide for movement of the material in the feeder bin to the feed chute concomitantly with movement of the conveyor being fed thereby. In one preferred embodiment of the invention this entails a driving connection between the feeder conveyor and a terminal sprocket of the conveyor being fed.

It is therefor an object of the present invention to provide conveyor means for feeding material received from a source to a conveying means such as a horizontal loop conveyor.

Another object of this invention is to provide an improved feed means for feeding material to a conveyor element having a relatively deep and narrow troughed configuration.

An additional object of this invention is to provide improved feed means for uniformly feeding material onto a conveyor.

Still another object of the invention is to provide a feed means operable by having a driving connection to the conveyor being fed thereby.

Another object of the invention is to provide improved conveyor feed means of combined powered lateral or horizontal conveying and gravitational feed capability.

These and other objects of the instant invention are more fully specified in the following description with reference to the accompanying figures in which:

FIG. 1 is a top plan view of a feed means constructed according to one embodiment of the instant invention;

FIG. 2 is a side elevation taken on line II—II of FIG. 1;

Figure 3:
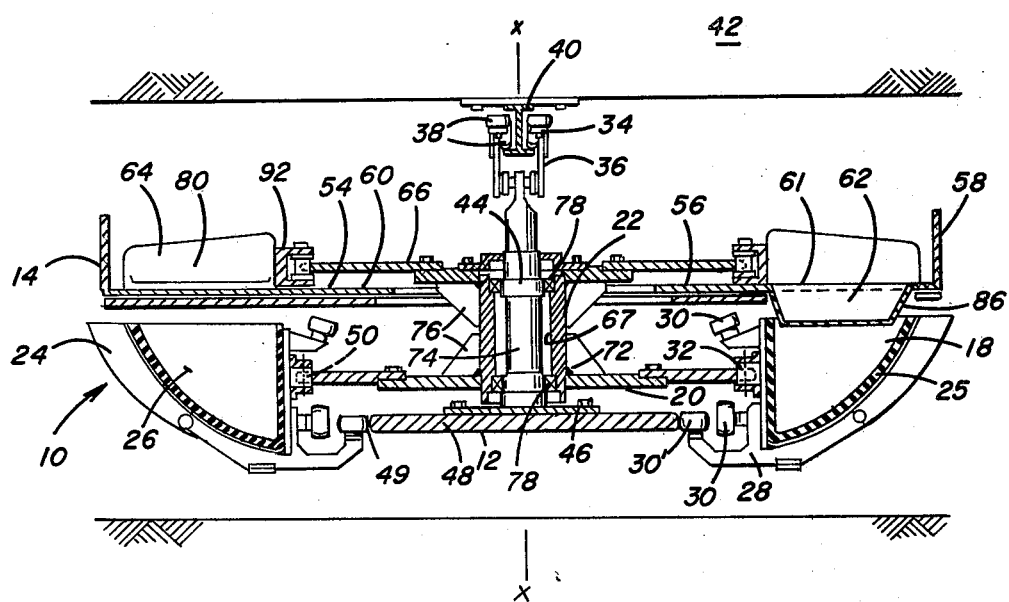
FIG. 3 is a transverse section taken on line III—III of FIG. 1.

There is generally indicated in FIGS. 1 through 3 a conveyor apparatus 10 having a longitudinal end portion 12 which cooperates with a feeder apparatus 14 constructed according to one embodiment of the instant invention. As shown, conveyor 10 includes an elongated, longitudinally segmented and flexible spine-like frame or support assembly 16 comprised of plural vertebra-like support elements 17 which are carried by an elongated, flexible spine member 15 extending longitudinally of the frame 16. Guide means such as longitudinally extending roller tracks (not shown) are carried by elements 17 for guiding an endless flexible conveying element 18 in a generally horizontally extending closed loop path that extends longitudinally adjacent the laterally opposite sides of frame 16. At the longitudinal ends of frame 16 conveying element 18 defines a terminal end portion of its path by passing around suitable terminal guide means, for example terminal sprockets 20 (only one of which is shown) supported for rotation about a generally vertical pivot axis X—X by pivot axis means 22 suitably carried adjacent the longitudinal ends of frame 16. The portions of the closed loop path extending longitudinally adjacent the opposite lateral sides of frame 16 intermediate the terminal sprockets 20 comprise the conveying and return runs of element 18.

As shown, conveying element 18 comprises an endless flexible belt assembly 24 including a flexible belt member 25 having a relatively deep and narrow cross sectional troughed configuration which defines therein a material conveying pocket 26 coextensive with belt 25. Belt assembly 24 includes support means cooperable with the hereinabove mentioned guide means for supporting belt assembly 24 in its orbital movement about the describ horizontally extending path. For example, belt assembly 24 may include plural, longitudinally spaced rigid support bracket means 28 having rollers 30, 30' cooperable with the hereinabove mentioned tracks, and an endless, longitudinally extending tension element such as a chain 32 affixed to a laterally inner side portion of belt 25 in a manner to support the tension loads imposed thereon and to engage sprockets 20 for support of belt assembly 24 during its traverse of the terminal ends of frame 16. Selectively operable power means (not shown) such as a suitable drive motor drivingly engaging one of sprockets 20 is provided to selectively orbitally drive the belt assembly 24 through its closed loop path.

It is to be understood that feeder 14 of this invention is shown as being cooperably associated with terminal end 12 of conveyor 10, commonly called the inby or feed end, for purposes of simplicity only. In fact, the invention is not so limited and the feeder 14 hereinbelow described may be readily employed to feed material into pocket 26 at points spaced from the terminal end portion 12.

The entire conveyor assembly 10 may be supported in any suitable manner as by a monorail support assembly 34 whereby conveyor 10 is suspended from a plurality of longitudinally spaced trolley assemblies 36, each having rollers 38 which engage a generally I-beam shaped elongated track 40 suitably secured to mine roof 42.

As shown in FIG. 3 the pivot axis 22 is comprised in part of an elongated stepped pivot axis and support member 44 which is supported in a suitable manner as by hanging vertically from one of trolley assemblies 36. Member 44 includes a lower mounting plate 46 to which a laterally outwardly extending guideway member 48 is affixed for the purpose of guiding rollers 30' of belt assembly 24 about a generally arcuate peripheral portion 49 thereof as belt assembly 24 passes around sprocket 20.

Belt assembly 24 traverses sprocket 20 from one lateral side of support frame 16 to the other lateral side thereof with pocket 26 in a continuously upwardly open configuration. Accordingly, during its travel around sprocket 20 the radially inner wall of belt member 25 travels a much shorter distance than does the radially outer wall thereof, and the radially outer belt wall is therefore provided with integrally formed flexible pleats 52 which expand to permit belt 25 to pass around sprocket 20 without collapsing radially inwardly. It will be appreciated that other modes of belt support for traverse of conveyor terminal end portion 12 are contemplated, as for example rolling engagement of the plural rollers 30, 30' in cooperably disposed guideways or tracks (not shown) extending around terminal end portion 12 in lieu of sprocket 20.

The feeder means 14 of this invention comprises an elongated body 54 suitably supported so as to partially overly terminal end portion 12 of conveyor 10, for example as by being suspended thereover by ones of the described trolley assemblies 36. Body 54 includes a generally flat and horizontally extending floor pan or deck portion 56 having upwardly extending sidewalls 58 affixed thereto and extending adjacent the outer periphery thereof to define a containment means shown as a bin or platform portion 60 for containing material to be fed into conveyor belt pocket 26. The periphery of bin 60 adjacent the longitudinal ends of body 54 is generally of arcuate form and at least the end thereof overlying terminal end 12 includes a generally circular peripheral portion 63 disposed generally coaxially with axis X—X. The capacity of bin 60 as reckoned by the area of a cross sectional plane preferably is substantially equal to the capacity of belt pocket 26, similarly reckoned, so that uniform and efficient belt loading may be readily achieved.

A feed aperture or gravity chute means 62 is defined by an opening 61 formed in portion of floor pan 56 overlying terminal end portion 12 and preferably directly over pocket 26 to feed material into pocket 26 as belt 25 is beginning its run toward the opposite longitudinal end of frame 16. Preferably, chute 62 is so positioned that material is fed only to portions of belt 25 which have substantially completely traversed sprocket 20 since pleats 52 in those belt portions are no longer stretched or distended. Chute 62 includes guide means such as members 86 extending adjacent the side and rearward peripheral portions of opening 61 and projecting generally in a downwardly converging fashion into pocket 26 and overlapping the upper extent of belt 25 to efficiently guide the conveyed material into pocket 26 with minimal material spillage. The forward end 63 of opening 61 does not have such a guide member associated therewith.

Feeder 14 includes a conveying or material transporting means such as a flighted scraper conveyor 64 having an endless, preferably universally pivoted chain 92 trained about a drive sprocket 66 and an idler sprocket 68 for orbital movement in an elongated closed loop path about floor pan 56 within bin 60 in the direction of arrows 70. Plural, longitudinally spaced flights 80 suitably affixed to chain 92 sweep floor pan 56 to move material which has been deposited in bin 60 toward chute 62 for feeding into pocket 26 therebelow. Idler sprocket 68 is suitably rotatably journaled in suitable conventional bearing means (not shown) carried by feeder body 54 while drive sprocket 66 is rotatably carried by pivot axis means 22 as follows.

Referring to FIG. 3 it will be seen that sprocket 20 is rigidly affixed as by weldments 72 coaxially adjacent the lower longitudinal end of a generally tubular elongated rotary member 74 having a stepped cylindrical inner periphery 67. Flight conveyor drive sprocket 66 is similarly rigidly affixed coaxially adjacent the opposite longitudinal end of member 74 and the assembly of each of sprockets 20 and 66 to member 74 is reinforced as by welding of plural gusset members 76 thereto. Member 74 coaxially encompasses and is rotatably journaled and supported with respect to pivot axis member 44 by suitable, axially spaced rotary bearing assemblies 78 with member 74 traversing the plane of floor pan 56 such that sprocket 66 is located upwardly adjacent the floor pan 56. Preferably the pitch diameters of sprockets 20 and 66 are substantially equal so that the velocity of belt 25 as it passes around sprocket 20 and beneath chute 62 is substantially equal to the velocity of the material being conveyed by flights 80 to chute 62. This, in conjunction with the approximate equality of bin and belt pocket cross sectional areas provides for a desirably efficient and uniform feeding of material into pocket 26. Because guides 86 overlap the top of belt 25 material may be loaded through chute 62 up to the level of floor pan 56. Any material piled above this level will be swept forward into a forward end portion 82 of bin 60 by conveyor 64. The excess material is thence recirculated by conveyor 64 around the periphery of bin 60 and back to chute 62 once again. The material deposited in pocket 26 up to the level of the floor pan 56 is conveyed by movement of belt 25 in the direction indicated by arrows 84 forwardly out of the forward open end 63 of chute 62 whereupon the material piled above the sidewalls of belt 25 and previously supported by guide members 86 will assume a mound-like form sloping from a central peak downwardly and outwardly to the upper interior wall portions of belt 25.

Feeder body 54 may be hinged as at 88 (FIG. 2) and provided with suitable power means such as fluid actuated jacks 90 for selective vertical movement thereof to desired elevations of the outer end portion 81 of body 54. 10. For example, the outer end portion 81 may be lowered to an elevation near the mine floor to simplify the loading of material into bin 60. In this case flighted conveyor 64 serves to sweep material forward and upward along the inclined portion of floor pan 56 to chute 62.

A suitable cover plate 94 for covering idler sprocket 68 may be provided as shown to prevent jamming of conveyor 64 by the material being conveyed and possible consequent damage to chain 92 or to the teeth of sprocket 68. An entirely similar cover plate (not shown) may be provided to cover drive sprocket 66 or other components requiring protection.

In an unillustrated refinement of the hereinabove described embodiment, the elongated feeder body 54 may be suitably pivotally supported for rotation substantially about axis X—X whereby the outwardly extending body end portion 81 may be selectively swung to the left or right to receive material from shuttle cars or other conveying means approaching from different directions. In this refined embodiment chute 62 is formed so as to remain suitably positioned at all times to deliver material to a portion of belt 25 in which pleats 52 are not stretched or distended as described hereinabove. This may be accomplished, for example, by having the portion of floor pan 56 including chute 62 separate from and rotationally stationary with respect to the rotatable body end portion 81.

Figure 4:
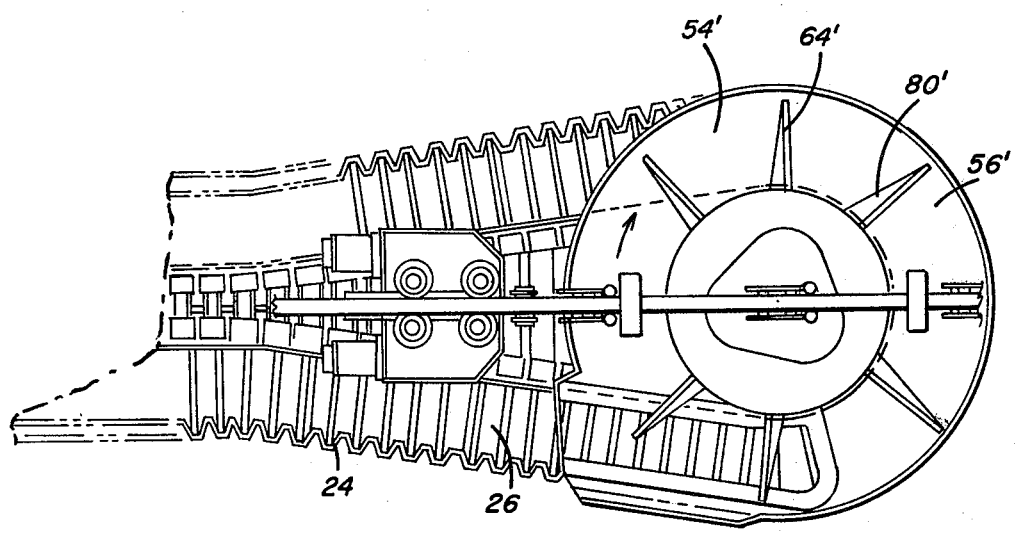
FIG. 4 is a top plan view similar to FIG. 1 showing an alternate embodiment of the feeder of this invention.

The elongated adjustable deck structure described hereinabove is most desirable in low coal mines or other restricted headroom environments. In more favorable conditions the invention may be readily practiced as an alternate embodiment including, as shown in FIG. 4, a feeder body 54' having a generally circular form and located coaxially with respect to axis X—X. Flighted conveyor means 64' is disposed to traverse a generally circular path about a floor pan 56' of body 54' to move material deposited therein to a chute 62' for loading thereof into the belt pocket 26 in substantially the same manner as described hereinabove. This alternate embodiment offers the advantages of a light and compact structure and simplicity of design. For example, the flighted conveyor 64' includes no chain and requires no drive sprocket. Flights 80' may be affixed directly to a suitable rotary member provided in lieu of a drive sprocket 66 and preferably are angled forwardly (in the direction of travel) to compensate for the velocity differential between the radially inner and outer ends thereof.

In another alternate embodiment (not shown) the improved feeder means 14 may be located at a point intermediate the longitudinal ends of frame 16 for loading belt 25 at such intermediate point. In this case belt 25, instead of passing around sprocket 20 directly beneath a portion of feeder body 54, would pass beneath chute 62 during its travel between the terminal ends of frame 16. In this embodiment as in others described hereinabove it is preferred to drive flighted conveyor 64 by means of a driving connection to the conveyor being fed.

According to the description hereinabove there is provided by the instant invention improved feed means for feeding material delivered thereto to a troughed conveying belt in an efficient and uniform fashion. The improved feed means of this invention additionally provides for temporary storage of material delivered thereto but exceeding the immediate capacity of the conveyor belt being fed. The invention still further provides for a portion of the feed means being selectively positionable at desired elevations for such purposes as to more readily receive material from conventional conveyances.

Notwithstanding the description hereinabove of a particular preferred embodiment of the invention, it is to be appreciated that this invention may be practiced in various alternative embodiments with numerous modifications without departing from the broad spirit and scope thereof. For example: flighted conveyor 64 may be any of the various suitable types of conveying means; feed means 14 may be used to feed any of a variety of belt conveyors at any of a number of selected points intermediate or adjacent the longitudinal ends thereof; the described support of feed means 14 by an overhead monorail is exemplary only and may be substituted by any of a variety of support means such as wheeled carriages; the shape and size of chute means 62 as well as the vertical spacing thereof from the conveyor belt to be loaded may be varied according to the configuration of pocket 26 and the density, particle size and natural angle of repose of the material being conveyed; the flight conveyor 64 may be powered independently of the conveyor to which material is being fed; and the like. These and other embodiments and modifications having been envisioned and anticipated by the inventor, this invention should be interpreted as broadly as permitted by the scope of the claims appended hereto.

What is claimed is:

1. A material conveying means for conveying solid material comprising: a bin for receiving and containing such solid material therein; a conveying element including laterally spaced apart upstanding sidewall portions extending longitudinally thereof to partially define an elongated pocket adapted to receive and contain such solid material therein; said pocket being movable in the direction of the longitudinal extent thereof through a predetermined path of travel with respect to said bin; said bin including feed aperture means overlying said pocket for feeding such material from said bin into seriatim portions of said pocket during continuous movement of said seriatim portions of said pocket along said path and past said feed aperture means; material transporting means cooperable with said bin for transporting material contained in said bin to said feed aperture means for feeding of such material into said seriatim portions of said pocket; and feed chute means depending from said feed aperture means and internally overlapping said sidewall portions of said pocket to control feeding of such material through said aperture means and into said pocket independently of the rate at which such material is moved to said aperture means for such feeding thereof.

2. A material conveying means as claimed in claim 1 wherein said bin includes a floor portion thereof enclosed by generally upstanding bin sidewall portions and said feed aperture means is formed in said floor portion within the confines of said bin sidewall portions.

3. A material conveying means as claimed in claim 2 wherein said material transporting means cooperates with said feed aperture means to maintain within said bin any excess of such material which has been transported by said material transporting means to said feed aperture means but which exceeds the capacity of said seriatim portions of said pocket.

4. Improvement as claimed in claim 3 wherein said material transporting means includes an endless conveyor means movable in a closed path about said floor portion of said bin.

5. A material conveying means as claimed in claim 4 wherein said endless conveyor means is supported and guided in part by first rotary means which includes a driving connection to a second rotary means that supports and guides said conveying element.

6. A material conveying means as claimed in claim 4 wherein a portion of said closed path coincides with the location in said floor portion of said feed aperture means.

7. A material conveying means as claimed in claim 3 wherein such excess material maintained within said bin is recirculated within said bin to said feed aperture means for feeding thereof through said feed aperture means to said pocket.

* * * * *